J. J. FLANNELLY.
SPROCKET WHEEL.
APPLICATION FILED JULY 8, 1914.

1,162,046.

Patented Nov. 30, 1915.

Witnesses
Frederick R. Moran
O. Edmonston Jr.

Inventor
J. J. Flannelly
By Victor J. Evans
Attorney

COLUMBIA PLANOGRAPH CO., WASHINGTON, D. C.

UNITED STATES PATENT OFFICE.

JOSEPH J. FLANNELLY, OF SCRANTON, PENNSYLVANIA.

SPROCKET-WHEEL.

1,162,046.  Specification of Letters Patent.  Patented Nov. 30, 1915.

Application filed July 8, 1914. Serial No. 849,802.

*To all whom it may concern:*

Be it known that I, JOSEPH J. FLANNELLY, a citizen of the United States, residing at Scranton, in the county of Lackawanna and State of Pennsylvania, have invented new and useful Improvements in Sprocket-Wheels, of which the following is a specification.

This invention relates to sprocket wheels and more particularly to the construction of means for securing the sprocket tooth within the wheel so that when worn it may be conveniently removed and replaced. In wheels of this character where removable teeth are used it is necessary that the teeth have a firm seat and when loose may be conveniently tightened up in a simple manner. There are numerous devices for attaching sprocket teeth to wheels but in most of these structures once the tooth becomes loose it remains loose, there being no satisfactory way in which to tighten them.

It is, therefore, the object of this invention to provide a wheel having a tooth seat formed therein and a tooth to fit said seat and having means for drawing the teeth firmly into engagement with the seat without the use of special tools.

Further objects of the invention will appear as the following description is read in connection with the accompanying drawing, which forms a part of this application, and in which:—

Figure 1:
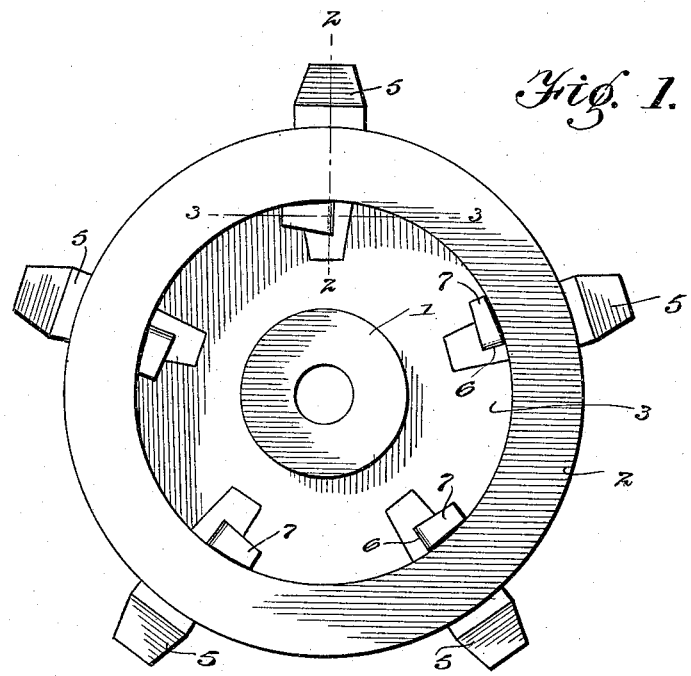
Figure 2:
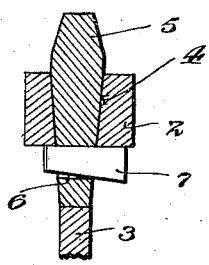
Figure 3:
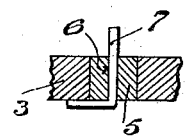

Figure 1 is a side elevation. Fig. 2 is a detail sectional view taken on the line 2—2 of Fig. 1. Fig. 3 is a similar view taken on the line 3—3 of Fig. 1.

Referring more particularly to the drawing, 1 represents the hub of the wheel which is connected to the rim 2 by the web 3. Formed in the rim 2 at suitable intervals are sockets 4 having tapering side walls and extending into the web 3. The teeth 5 are tapered from a point approximately their centers toward opposite ends, as shown, and the end which fits in the socket 4 is provided with a transverse opening 6 to receive a locking key 7. This locking key is preferably constructed of soft steel and is tapered upon one side so that when driven in against the underside of the rim will draw the tooth down into the tapered socket, thereby insuring firm seating of the same. The key 7 being bendable is capable of being locked in position by bending its small end over the web 3.

When the tooth becomes loose all that is necessary is to tap the key upon the end with a hammer.

What is claimed is:—

In a sprocket wheel comprising a hub and a rim, a relatively thin web connecting the hub with the rim, sockets radially arranged within said rim, and passing through said rim and extending into the web, teeth mounted in said sockets, each of said teeth being provided with transverse openings adjacent one end thereof, and keys passing through said openings having one side thereof lying abutting the shoulder formed at the juncture of the rim and the web.

In testimony whereof I affix my signature in presence of two witnesses.

JOSEPH J. FLANNELLY.

Witnesses:
 FRED L. FRITZ,
 EDW. G. SMITH.

Copies of this patent may be obtained for five cents each, by addressing the "Commissioner of Patents, Washington, D. C."